United States Patent [19]

Altman et al.

[11] Patent Number: 5,689,649

[45] Date of Patent: Nov. 18, 1997

[54] SYSTEM FOR OPERATION OF A COMBINATION MORTGAGE, EQUITY LOAD AND SAVINGS PLAN

[76] Inventors: Robert Altman, 195 Hackensack Ave.; John W. Cleary, 113 Parkway, both of Harrington Park, N.J. 07640; Morris Markowitz, 249-15 Cullman Ave., Little Neck, N.Y. 11362

[21] Appl. No.: 662,970

[22] Filed: Mar. 1, 1991

[51] Int. Cl.[6] ................................................ G06F 17/60
[52] U.S. Cl. ........................................ 395/236; 395/238
[58] Field of Search ........................ 364/402, 200, 364/408; 395/201, 230, 235, 236, 237–239

[56] References Cited

U.S. PATENT DOCUMENTS

| | | | |
|---|---|---|---|
| 3,697,693 | 10/1972 | Deschenes | 364/408 |
| 4,194,292 | 3/1980 | Robbins | 364/200 |
| 4,346,442 | 8/1982 | Musmanno | 364/408 |
| 4,376,978 | 3/1983 | Musmanno | 364/408 |
| 4,642,768 | 2/1987 | Roberts | 364/408 |
| 4,648,038 | 3/1987 | Roberts et al. | 364/408 |
| 4,694,397 | 9/1987 | Grant et al. | 364/408 |
| 4,722,055 | 1/1988 | Roberts | 364/408 |
| 4,742,457 | 5/1988 | Leon et al. | 364/408 |
| 4,750,121 | 6/1988 | Halley et al. | 364/408 |
| 4,752,877 | 6/1988 | Roberts et al. | 364/408 |
| 4,876,648 | 10/1989 | Lloyd | 364/408 |
| 4,953,085 | 8/1990 | Atkins | 364/408 |

*Primary Examiner*—Gail O. Hayes
*Assistant Examiner*—Steven R. Yount

[57] ABSTRACT

A "Nest-Egg" mortgage which combines the benefits of a conventional home mortgage, a home equity loan, and an individual retirement account ("IRA"), including a method and computer system for operating and implementing same.

13 Claims, 4 Drawing Sheets

SYSTEM FOR OPERATION OF A COMBINATION MORTGAGE, EQUITY LOAD AND SAVINGS PLAN

TECHNICAL FIELD

The present invention relates to a new concept in home mortgages that includes a growing, thriving, savings plan which provides savings far beyond the equity created by conventional mortgages. This concept includes the combination of the desirable features of a mortgage loan, a home equity loan, and an ongoing savings plan, such as a growing individual retirement account ("IRA"), all from the same borrower.

BACKGROUND OF THE INVENTION

The economics and life styles of America are built on the backs of its immigrants. From every corner of the world, waves of foreign labor came seeking jobs, housing, and a taste of the good life. For most, jobs were tough, life was tougher, and housing depended on what they could afford to rent.

In a short generation or two, these people realized that drawers full of rent receipts were not getting them their piece of the American dream and that home ownership was the answer. The Great American dream, became, in reality, the Great American Mortgage.

A traditional mortgage allows affordable monthly payments over a long term, and enabled the mortgagee to build meaningful equity. Combined with rising real-estate values and normal (or sometimes abnormal) inflation, the mortgagee was able to amass a modicum of wealth.

For a long time, the success of America was based on population growth leading to housing booms, leading to baby-booms (i.e., more population growth), in turn leading to more housing booms—all of which leads to more mortgages being issued by financial institutions. Though interrupted by wars, the cycles of business, and the insecurity of the stock-market and other investments, housing growth remains as one of the most accurate measures of America's economic pulse.

There have been numerous kinds of mortgages used to facilitate the financing of real property, but the most common provisions require the borrower to pay equal periodic installments, which include an interest payment and a principal payment, over a period of time until the mortgage was paid. The premise of the agreement between lender and borrower is based on a specific interest rate for a specific number of payments over a specific term. This has been the backbone of the home mortgage business until recently, when fluctuations in the interest rates that banks pay, and the rates of their mortgage loans, have caused the banks to suffer adverse consequences.

In attempting to solve this problem, the banks have instituted the adjustable rate mortgage ("ARM") which permits the rate, and therefore the borrower's payments, to fluctuate, usually along with some other market instrument, to maintain the bank's profitability. Unfortunately, ARMs may adversely affect the borrower to the point that he cannot afford rising payments. In that situation, the bank forecloses, the mortgagee loses the house, and nobody wins.

Recently, systems have been proposed to combine home mortgages with other investment vehicles. One such system creates mortgage plans based upon mortgages which are least partially collateralized by investment vehicles (U.S. Pat. No. 4,876,648). Also, a personal financial management system has been suggested which applies client funds that would normally be used to amortize a mortgage to instead increase the value of a designated asset account (U.S. Pat. No. 4,953,085). While these systems have merit, the mortgagee is relying upon the investment vehicle or investment account to reimburse the bank for all or at least a major portion of the amount borrowed after a predetermined term.

The present invention provides an alternate plan to these newly proposed systems, as well as to the ARMs or other conventional mortgages, in a simpler, more reliable, mortgagee-attractive mortgage plan. This system gives the bank greater income and a more certain outcome, while also protecting the borrower from the unpredictability of adjustable rates or investment conditions, and creating a vastly larger equity over the period of the mortgage.

SUMMARY OF THE INVENTION

The present invention relates to a system and a method for operating and implementing a nest egg mortgage plan which comprises determining an amount of mortgage for which an applicant would qualify and a predetermined term of repayment of principal therefor based on conventional lending practices, creating an accelerated payment schedule for such mortgage so that the principal is repaid within a shorter time than the predetermined term of the mortgage, applying the difference between the accelerated payments and non-accelerated payments as a source of equity, providing an equity loan against the source of equity, and applying the loan to generate an investment vehicle. Thus, amounts placed in the investment vehicle increase in value over the term of the mortgage while the equity loan and mortgage principal are repaid to the lending institution by the end of the term of the mortgage.

Preferably, the accelerated payment schedule is created by providing a bi-weekly mortgage payment plan, and the equity loan is provided as a home equity loan. The investment vehicle may be an individual retirement account, a savings account, a securities investment account, an insurance policy, an annuity, or combinations thereof. In this system and method, all paperwork in connection with the mortgage plan is generated before the mortgage is implemented, and computer means is utilized to operate and implement the mortgage plan.

The system of the invention includes the respective means to carry out the previously described method steps. Preferably the means for creating an accelerated payment schedule is a bi-weekly mortgage payment plan, and the equity loan and investment vehicle are as described above.

The invention also relates to a nest egg mortgage comprising an amount of mortgage principal, a predetermined term for repayment of such principal, an accelerated payment schedule of repayment of mortgage principal over a term which is shorter than the predetermined term, an equity source created by the difference between the accelerated payments and non-accelerated payments, an equity loan accessible against the source of equity, and an investment vehicle for receiving the equity loan. The investment vehicle increases over the predetermined term of the mortgage while the equity loan and mortgage principal are repaid by the end of the predetermined term of the mortgage.

Preferably, the accelerated payment schedule is a bi-weekly mortgage payment plan, and the investment vehicle is an individual retirement account, a savings account, a securities investment account, an insurance policy, an annuity, or combinations thereof. Also, the equity loan is a home equity loan which is made annually into the investment vehicle. Finally, the predetermined term generally is between 15 and 30 years.

DETAILED DESCRIPTION OF THE INVENTION

The present invention includes a very specific methodology for projecting specific monthly payments over a specific term, while also creating an automatically borrowable home equity loan, with amounts borrowed therefrom automatically shunted into an investment vehicle. Preferably, this investment vehicle will be an IRA so that the mortgagor can receive maximum benefits under the tax laws. However, this investment vehicle may also be an insurance policy, mutual fund, stocks, bonds, etc., or a combination thereof, depending on the homeowner's option. Also, any of the currently known types of insurance policies may be utilized herein as the investment vehicle. For the purpose of illustration, an IRA investment vehicle will be discussed herein.

The capital needed to fund the IRA can come from either of the following sources: additional payments (i.e., required prepayments) of the mortgage, or amounts borrowed from a home equity loan based on the equity in the home or the equity created by repayment of the mortgage principal. In addition, this source can combined with greater benefits to the mortgagee.

A most preferred system for making required prepayments of the mortgage is the so-called "bi-weekly" mortgage. This mortgage requires the payment of one-half the amount of a conventional amortized mortgage payment every other week. For example, assuming a conventional mortgage payment of $1200 per month, twelve times per year, the bi-weekly mortgage payment would be $600, paid every two weeks. This creates two extra payments (equal to one extra conventional mortgage monthly payment) each year. Over a 15 year loan on a $100,000 mortgage at 10% interest rate, for example, these extra payments amount to about $18,000. This amount is used to reduce principal of the mortgage, so that the bi-weekly payment pays down the mortgage in just over 12 years, rather than 15.

Instead of completing the mortgage payments in the twelve year period, however, the system of the present invention requires that the mortgagee continue to make bi-weekly payments for the full term of the loan, i.e., 15 years as in the previous examples, as will be further explained below.

The additional payments each year allow an equity to be built up due to the faster repayment of principal of the mortgage. This equity then can serve as the basis of a home equity loan from which an amount may be borrowed annually by the mortgagee and placed in a savings vehicle, such as an IRA.

The benefits of the present system are that, after the complete term of the mortgage is completed:

1. the mortgage is paid;
2. the home equity loan is paid; and
3. a sizable nest-egg, over and above the mortgage property has been created and is available to the homeowner in an IRA account.

The bank or lender is much more profitable with this system than with a convention mortgage. In addition to the interest and amortization of the mortgage, the lending institution receives the home equity loan interest and amortization plus income from use of the mortgagee's IRA funds which are deposited with the lending institution.

The benefits to the homeowner include:

1. Automatic integration of features.
2. Maximum tax savings.
3. Low-cost IRA savings.
4. Largest accumulation of wealth.
5. The bi-weekly payment feature.
6. Forced savings into IRA account.
7. Provides an equity source for family emergencies.
8. Potential for adding on features for additional financial opportunities.

These savings created by automatic integration of computer projected benefits. All elements of the mortgage function causatively and automatically: The bi-weekly mortgage payment automatically causes a home equity loan to be created after the first year of payments. This requires no further agreements, paperwork, applications, appraisals or legal fees. Moreover, the home equity loan, in turn, automatically causes an IRA to be created without new application or paperwork. All of the mechanics are included in the original mortgage loan paperwork.

In conventional mortgages, the mortgagee must cover such expenses at closing as mortgage tax, points, legal fees, etc., and this can amount to approximately $5,000 (on a $100,000 loan). Similar costs are also incurred if the mortgagee opts for a home equity loan at a later date. Therefore, this automatic procedure at mortgage origination saves such similar costs (i.e., approximately $5,000 for this example).

Maximum tax savings are achieved by combining two types of loans that the Federal Tax Regulations consider tax-deductible: home mortgages and home equity loans. Thus, the mortgagee enjoys maximum tax deductibility on his returns.

FIGS. 1-4 represent a schematic flow chart describing the data processing methodology and structure in accordance with the principles of the invention. This methodology is used to generate a monthly report of the balances of the various accounts maintained during the course of a 15 year mortgage.

Figure 1:
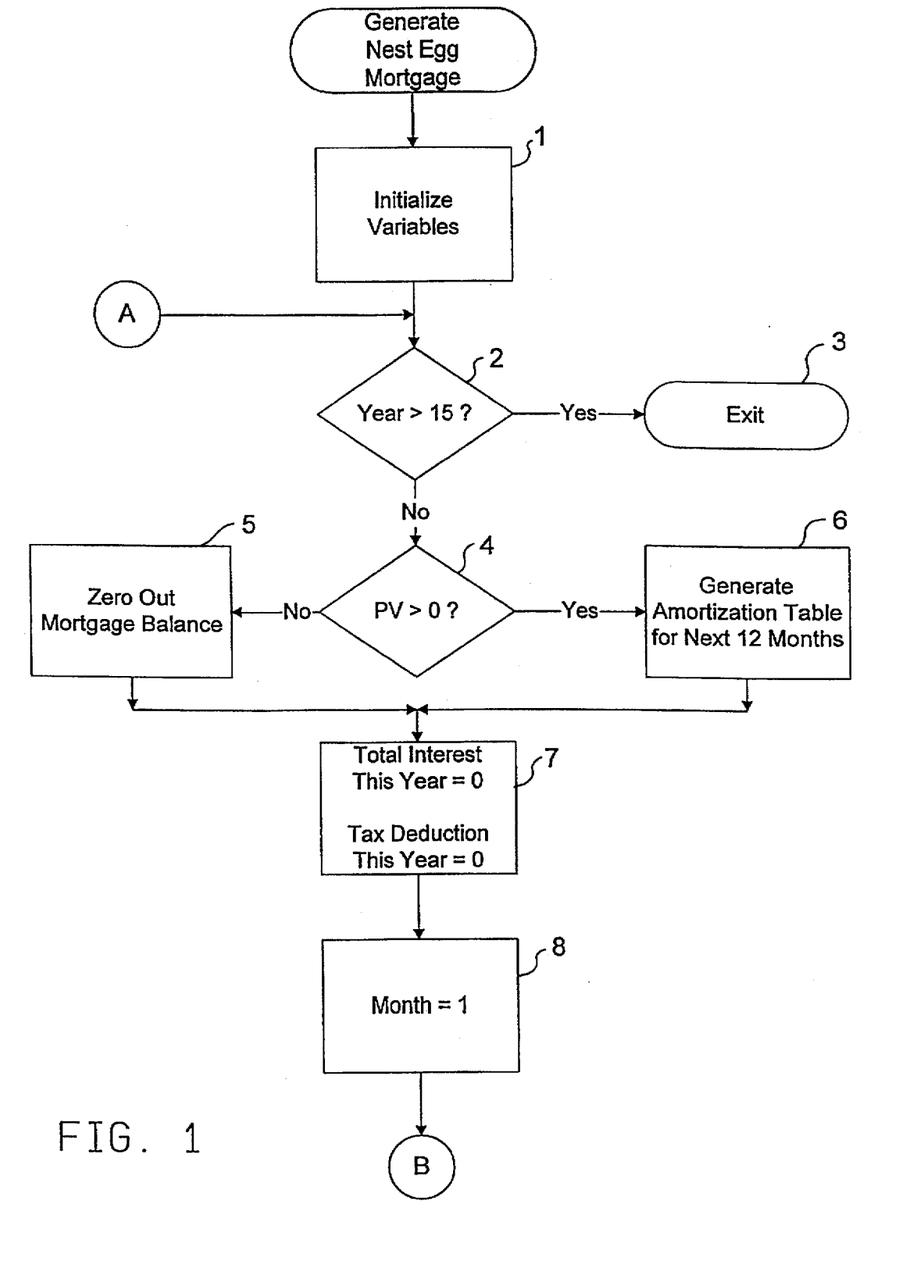
FIGS. 1-4 represent a schematic flow chart which describes the data processing methodology and structure in accordance with the invention.

In box 1 of FIG. 1, the following program variables are initialized:

PV: Present Value of Mortgage; initialized to the mortgage amount being borrowed.

PAYMENT: Set to monthly payment needed to service mortgagee's principal and interest payment according to conventional 15 year payback plan.

SAVINGS: Set to amount to borrow from home equity account each year for funding IRA account.

LOAN: Current amount in home equity loan; initialized to 0.

IRA: Current amount in IRA account; initialized to 0.

YEAR: Year of mortgage; initialized to 1.

Test 2 represents the outer loop of the Nest-Egg Mortgage calculation procedure. The YEAR variable is tested to determine if it is greater than 15. If so, the Nest-Egg Mortgage has been completed, and the procedure is exited.

If the Year is less than 15, test 4 is used to determine if the present value of the mortgage is greater than 0; i.e. if the primary mortgage has not yet been satisfied. If not, an amortization table for the next 12 months is generated in box 6. If full payment of the primary mortgage has been made, PV is then set to zero in box 5.

The Nest-Egg algorithm now calls for a month by month analysis to begin. The variables used in this month by month analysis are initialized in box 7. They are:
TOT INT: Total Interest This Year: Initialized to 0.
Tax Deductible Interest This Year: Initialized to 0.
MONTH: Initialized to 1.

Figure 2:
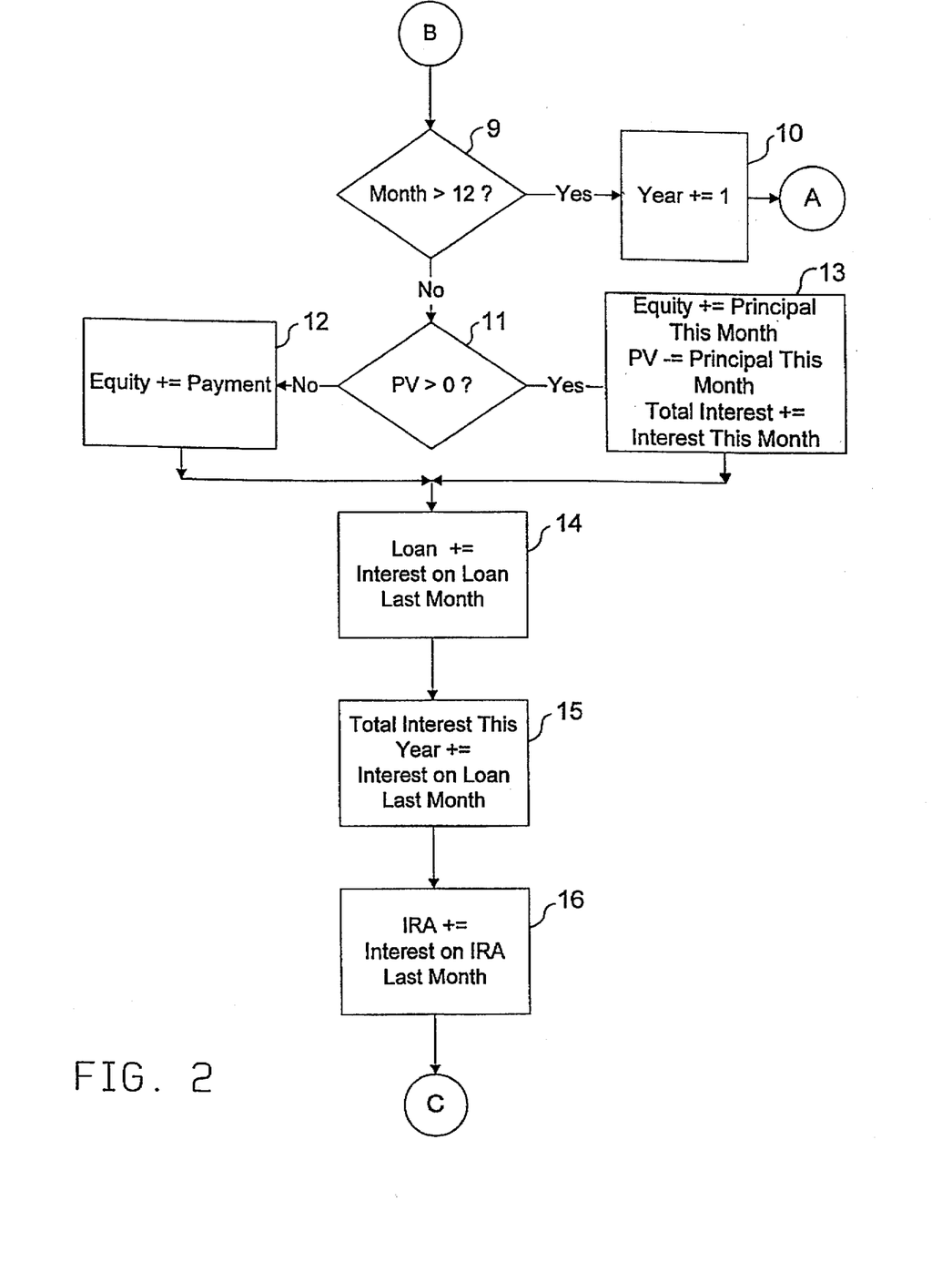

Entry point B on the flow chart of FIG. 2 represents the top of the inner loop; i.e., a month by month analysis using the algorithm. Test 9 is used to see if the MONTH variable is greater than 12. If it is, one is added to the YEAR variable in box 10, and control is transferred to Entry Point A of FIG. 1.

If not, test 11 checks if PV is greater than 0; i.e., is there more to pay on the primary mortgage. If not, the variable PAYMENT, representing the monthly principal and interest payment is added to the EQUITY variable in box 12. If there is additional amounts to pay on the variable, this month's principal is deducted from the PV variable, and this month's interest is added to the TOT INT variable, all in box 13. Common flow is rejoined at box 14, where the LOAN (Home Equity Loan) variable is adjusted to include the interest accrued in the last month. This interest is also added to the TOT INT variable in box 16. In box 17, the interest accrued on the IRA account over the last month is added onto the IRA balance.

In test 17, the MONTH and YEAR variables are tested to determine if it is the first month of a new mortgage year, and if it is at least one full year into the mortgage. If yes, test 18 checks to see if PV is greater than zero; i.e., has the primary mortgage been satisfied or not. If PV was greater than zero, the monthly payment stored in PAYMENT is subtracted from the PV variable in box 19. The PAYMENT is then to added to the EQUITY variable in box 20.

Control from the no output of test 17 is rejoined at test 21, where it is checked to determine if it is the first month of a new mortgage year, and it is at least one full year into the mortgage, and it is not the last year of the mortgage. If all of these conditions are met, control is transferred to Entry Point D.

Figure 3:
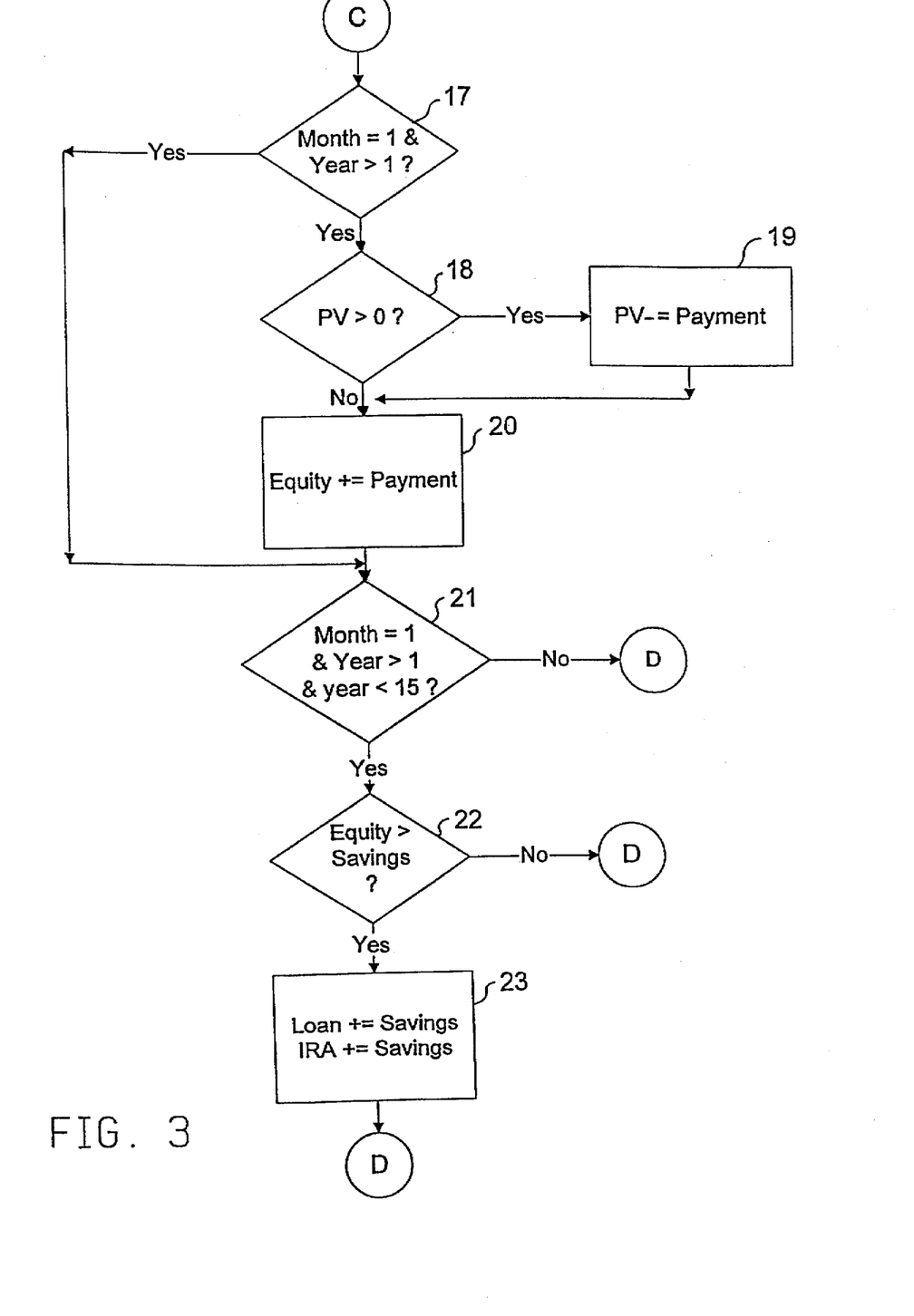

At test 22, the EQUITY variable is checked to see if it is greater than the SAVINGS variable. If it is, the amount to transfer into the IRA each year stored in SAVINGS is added to the current LOAN balance and to the current IRA balance in box 23.

Figure 4:
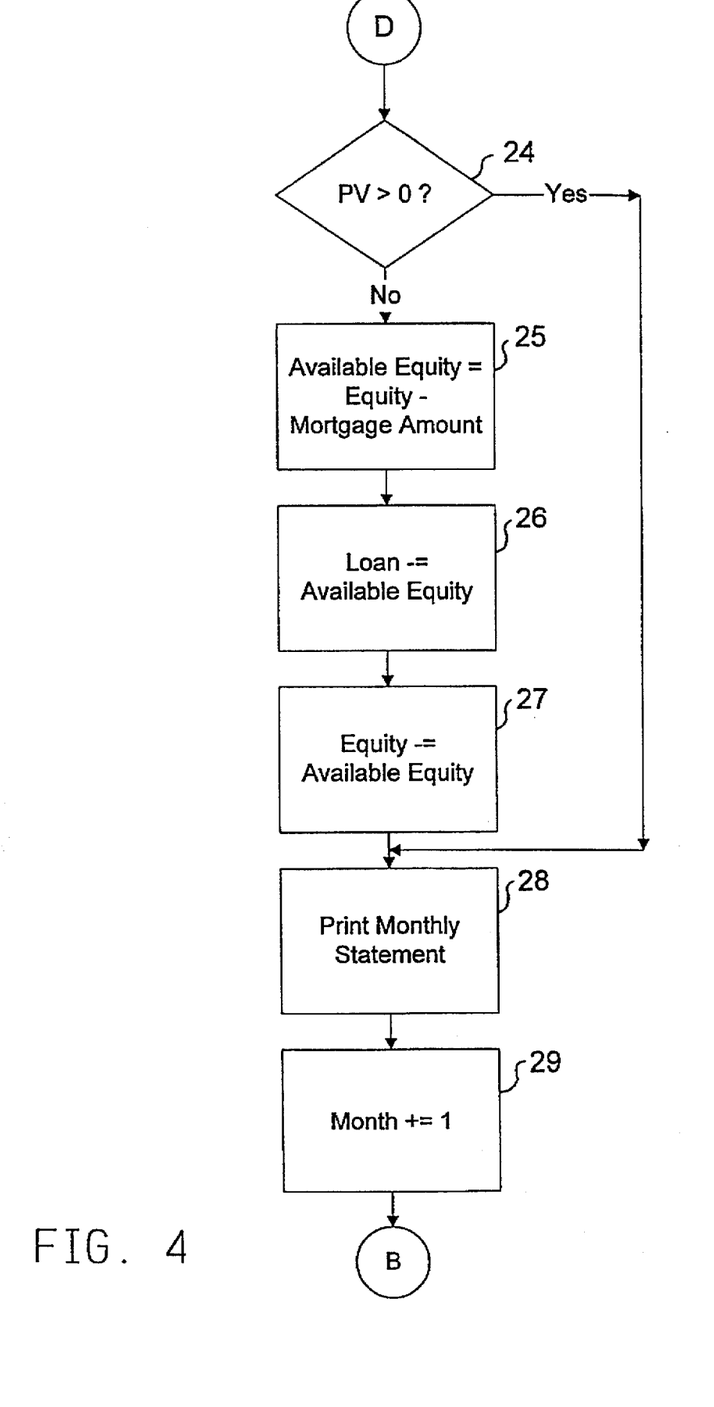

Control is rejoined at Entry Point D prior to test 24, where the PV variable is checked to see if it is greater than zero; i.e. has the primary mortgage been satisfied. This is shown in FIG. 4. If the answer to this is yes, control is transferred past boxes 25, 26 and 27 to box 28. If the answer was no, indicating that more payments were to be made against the primary mortgage, the servicing of the home equity loan takes place. In box 25, the available equity is calculated by deducting the purchase price of the house from the current contents of the EQUITY variable. IN box 26, the LOAN balance is then adjusted by deducting the amount previously calculated as the available equity. The EQUITY variable is then adjusted by subtracting the available equity to return the EQUITY variable to be equal to the original purchase price of the house.

Control is rejoined at box 28, where the monthly summary is printed. The month is incremented by one in box 29, and control is transferred to Entry Point B at the completion of this month's processing.

Next to the property and home, the IRA account can be the largest creator of wealth most Americans will ever achieve. It accumulates tax-free (deferred) income over a long term for the length of the mortgage. Even after the pay-back of the equity loan, the size of the accumulated IRA is surprising: for a 15 year "Nest-Egg" mortgage in accordance with the present invention, amounts accumulated in an IRA would be as follows:

| Size of Mortgage | IRA |
| --- | --- |
| $100,000 | $24,443.96 |
| $125,000 | 30,561.50 |
| $150,000 | 36,706,02 |
| $200,000 | 48,968.05 |
| $250,000 | 61,203.25 |

*Assumptions:
mortgage interest rate: 10%
home equity loan interest rate: 11.5%
IRA tax deferred interest rate: 8.5%

Over 70% of all Americans are still eligible to deduct IRA donations from taxable income. Added to the tax-deductions taken on the mortgage and home equity loans from which the IRA money is generated, the homeowner achieves maximum possible savings on his IRA.

Thus, the IRA account (or other investment savings or life insurance, etc.) provides for financial independence at retirement. This "Nest-Egg" is basically what the average homebuyer seeks to achieve when he takes on a mortgage. However, the forced savings inherent in the present Nest-Egg mortgage enhances this purpose, creating a second Nest-Egg after the home. A simple way to look at the end result is that the present Nest-Egg mortgage is a 25% enhancement policy: it creates a Nest-Egg of at least 25% again as large as the original amount borrowed.

Of course, should the home owner already have an IRA through his place of employment, then, considering the $2000 IRA limitation, the funds created by the Nest-Egg mortgage may be used in another financial vehicle, such as life insurance, annuities, stock investment, etc., or in combinations of the above, with automatic cost averaging.

Assuming the mortgagee already has an IRA at his work-place, he may opt at the mortgage origination to create a mortgage insurance policy, so should he die while the mortgage is still running, the family might retain the home, or, since it would be "mortgaged-out", sell it at full market value. The mortgagee may instead opt to convert his savings to any other form of savings vehicle at any time while the mortgage is in force, without disturbing the prescribed payments.

The Nest-Egg mortgage, by virtue of its automatic savings program, thus provides the family available cash in case of: accident, loss of employment, health emergency, natural disaster, education funding, etc., which enhances family stability and household integrity. This system is also consistent with national societal objectives endorsed by Congress in providing tax-shelters to home ownership and retirement savings.

EXAMPLES

The following are examples of the Nest-Egg mortgage of the present invention as it would run under actual conditions.

Each illustration describes the specifics of the projection, i.e. size of mortgage, starting at $100,000 and in $25,000 increments.

For illustration purposes, a constant interest rate of 10% is assumed for a mortgage having a term of 15 years. The rate for the home equity loan is assumed to be 11.5%, while the IRA rate is assumed to be 8.5%.

The final illustration shows the bi-weekly payments and its effect, compared to the annual projection for the same size mortgage and rate structuring are shown in the following tables:

| Table 1: | $100,000 Mortgage | ($915 Annual IRA Contribution) |
| Table 2: | $125,000 Mortgage | ($1,144 Annual IRA Contribution) |
| Table 3: | $150,000 Mortgage | ($1,374 Annual IRA Contribution) |
| Table 4: | $175,000 Mortgage | ($1,603 Annual IRA Contribution) |
| Table 5: | $200,000 Mortgage | ($1,833 Annual IRA Contribution) |
| Table 6: | $225,000 Mortgage | ($2,062* Annual IRA Contribution) |
| Table 7: | $250,000 Mortgage | ($2,297* Annual IRA Contribution) |

*exceeds maximum annual deductible amount for individual - consult tax laws for other limitations The following Table 8 illustrates the amounts paid monthly for the $100,000 biweekly Nest-Egg mortgage over the complete term of the mortgage. Note that the twelfth month payment includes the extra amounts paid by the two additional biweekly payments.

TABLE 1

The IRA Interest Rate is 8.5 Percent

| Year | Balance | Equity | Interest | Tax-Deduct | Loan | IRA |
|---|---|---|---|---|---|---|
| 1 | 96,968.22 | 3,031.78 | 9,863.54 | 2,761.79 | 0.00 | 0.00 |
| 2 | 93,618.99 | 7,455.62 | 9,647.30 | 2,701.24 | 1,016.21 | 988.88 |
| 3 | 88,731.89 | 12,342.72 | 9,307.28 | 2,606.04 | 2,155.66 | 2,065.16 |
| 4 | 83,333.05 | 17,741.56 | 8,933.71 | 2,501.44 | 3,433.28 | 3,236.57 |
| 5 | 77,368.88 | 23,705.73 | 8,523.31 | 2,386.53 | 4,865.83 | 4,511.54 |
| 6 | 70,780.17 | 30,294.44 | 8,072.46 | 2,260.29 | 6,472.07 | 5,899.18 |
| 7 | 63,501.57 | 37,573.04 | 7,577.34 | 2,121.66 | 8,273.08 | 7,409.47 |
| 8 | 55,460.78 | 45,613.83 | 7,033.52 | 1,969.39 | 10,292.46 | 9,053.28 |
| 9 | 46,578.01 | 54,496.60 | 6,436.43 | 1,802.20 | 12,556.73 | 10,842.38 |
| 10 | 36,765.10 | 64,309.51 | 5,780.87 | 1,618.64 | 15,095.58 | 12,789.64 |
| 11 | 25,924.65 | 75,149.96 | 5,061.16 | 1,417.12 | 17,942.26 | 14,909.01 |
| 12 | 13,949.05 | 87,125.56 | 4,271.21 | 1,195.94 | 21,134.14 | 17,215.72 |
| 13 | 719.49 | 100,355.12 | 3,404.31 | 953.21 | 24,713.08 | 19,726.31 |
| 14 | 0.00 | 100,000.00 | 2,198.59 | 615.61 | 13,146.50 | 22,458.80 |
| 15 | 0.00 | 100,000.00 | 773.40 | 216.55 | −50.03 | 24,443.96 |

TABLE 2

| Year | Balance | Equity | Interest | Tax-Deduct | Loan | IRA |
|---|---|---|---|---|---|---|
| 1 | 121,210.31 | 3,789.69 | 12,329.43 | 3,452.24 | 0.00 | 0.00 |
| 2 | 117,023.81 | 9,319.45 | 12,059.16 | 3,376.56 | 1,270.54 | 1,236.35 |
| 3 | 110,914.97 | 15,428.29 | 11,634.15 | 3,257.56 | 2,695.15 | 2,581.98 |
| 4 | 104,166.48 | 22,176.78 | 11,167.25 | 3,126.83 | 4,292.51 | 4,046.56 |
| 5 | 96,711.33 | 29,631.93 | 10,654.31 | 2,983.21 | 6,083.59 | 5,640.60 |
| 6 | 88,475.52 | 37,867.74 | 10,090.80 | 2,825.42 | 8,091.82 | 7,375.54 |
| 7 | 79,377.30 | 46,965.96 | 9,471.90 | 2,652.13 | 10,343.56 | 9,263.84 |
| 8 | 69,326.38 | 57,016.88 | 8,792.26 | 2,461.83 | 12,868.36 | 11,319.03 |
| 9 | 58,223.03 | 68,120.23 | 8,046.00 | 2,252.88 | 15,699.33 | 13,555.90 |
| 10 | 45,957.00 | 80,386.26 | 7,226.57 | 2,023.44 | 18,873.55 | 15,990.48 |
| 11 | 32,406.53 | 93,936.73 | 6,327.06 | 1,771.58 | 22,432.70 | 18,640.27 |
| 12 | 17,437.17 | 108,906.09 | 5,339.73 | 1,495.12 | 26,423.41 | 21,524.26 |
| 13 | 900.33 | 125,442.93 | 4,256.16 | 1,191.72 | 30,898.03 | 24,663.17 |
| 14 | 0.00 | 125,000.00 | 2,749.29 | 769.80 | 16,443.08 | 28,079.54 |
| 15 | 0.00 | 125,000.00 | 967.94 | 271.02 | −51.36 | 30,561.50 |

TABLE 3

| Year | Balance | Equity | Interest | Tax-Deduct | Loan | IRA |
|---|---|---|---|---|---|---|
| 1 | 145,452.38 | 4,547.62 | 14,795.30 | 4,142.68 | 0.00 | 0.00 |
| 2 | 140,428.57 | 11,183.34 | 14,471.10 | 4,051.91 | 1,525.99 | 1,484.92 |
| 3 | 133,098.01 | 18,513.90 | 13,961.31 | 3,909.17 | 3,237.03 | 3,101.11 |
| 4 | 124,999.84 | 26,612.07 | 13,401.17 | 3,752.33 | 5,155.54 | 4,860.15 |
| 5 | 116,053.68 | 35,558.23 | 12,785.82 | 3,580.03 | 7,306.69 | 6,774.66 |
| 6 | 106,170.77 | 45,441.14 | 12,109.91 | 3,390.77 | 9,718.68 | 8,858.42 |
| 7 | 95,252.97 | 56,358.94 | 11,367.51 | 3,182.90 | 12,423.16 | 11,126.35 |
| 8 | 83,191.92 | 68,419.99 | 10,552.19 | 2,954.61 | 15,455.57 | 13,594.75 |
| 9 | 69,867.92 | 81,743.99 | 9,656.97 | 2,703.95 | 18,855.71 | 16,281.35 |
| 10 | 55,148.75 | 96,463.16 | 8,674.07 | 2,428.74 | 22,668.12 | 19,205.42 |
| 11 | 38,888.28 | 112,723.63 | 7,595.07 | 2,126.62 | 26,942.83 | 22,387.94 |
| 12 | 20,925.13 | 130,686.78 | 6,410.73 | 1,795.00 | 31,735.88 | 25,851.77 |
| 13 | 1,081.00 | 150,530.91 | 5,110.97 | 1,431.07 | 37,110.15 | 29,621.78 |
| 14 | 0.00 | 150,000.00 | 3,303.37 | 924.94 | 19,770.87 | 33,725.02 |
| 15 | 0.00 | 150,000.00 | 1,166.27 | 326.56 | −17.69 | 36,706.02 |

TABLE 4

| Year | Balance | Equity | Interest | Tax-Deduct | Loan | IRA |
|---|---|---|---|---|---|---|
| 1 | 169,694.48 | 5,305.52 | 17,261.20 | 4,833.14 | 0.00 | 0.00 |
| 2 | 163,833.40 | 13,047.16 | 16,882.96 | 4,727.23 | 1,780.32 | 1,732.41 |
| 3 | 155,281.11 | 21,599.45 | 16,288.19 | 4,560.69 | 3,776.52 | 3,617.95 |
| 4 | 145,833.30 | 31,047.26 | 15,634.73 | 4,377.72 | 6,014.78 | 5,670.17 |
| 5 | 135,396.17 | 41,484.39 | 14,916.82 | 4,176.71 | 8,524.45 | 7,903.77 |
| 6 | 123,866.14 | 53,014.42 | 14,128.25 | 3,955.91 | 11,338.45 | 10,334.84 |
| 7 | 111,128.77 | 65,751.79 | 13,262.11 | 3,713.39 | 14,493.65 | 12,980.77 |
| 8 | 97,057.64 | 79,822.92 | 12,310.96 | 3,447.07 | 18,031.46 | 15,860.58 |
| 9 | 81,513.05 | 95,367.51 | 11,266.50 | 3,154.62 | 21,998.27 | 18,994.94 |
| 10 | 64,340.75 | 112,539.81 | 10,119.79 | 2,833.54 | 26,446.08 | 22,406.36 |
| 11 | 45,370.29 | 131,510.27 | 8,860.98 | 2,481.07 | 31,433.24 | 26,119.29 |
| 12 | 24,413.36 | 152,467.20 | 7,479.26 | 2,094.19 | 37,025.15 | 30,160.43 |
| 13 | 1,261.97 | 175,618.59 | 5,962.84 | 1,669.60 | 43,295.10 | 34,558.75 |
| 14 | 0.00 | 175,000.00 | 3,854.10 | 1,079.15 | 23,067.74 | 39,345.85 |
| 15 | 0.00 | 175,000.00 | 1,360.89 | 381.05 | −18.65 | 42,823.66 |

TABLE 5

| Year | Balance | Equity | Interest | Tax-Deduct | Loan | IRA |
|---|---|---|---|---|---|---|
| 1 | 193,936.56 | 6,063.44 | 19,727.08 | 5,523.58 | 0.00 | 0.00 |
| 2 | 187,238.22 | 14,910.99 | 19,294.93 | 5,402.58 | 2,035.75 | 1,981.00 |
| 3 | 177,464.20 | 24,685.01 | 18,615.32 | 5,212.29 | 4,318.36 | 4,137.10 |
| 4 | 166,666.70 | 35,482.51 | 17,868.64 | 5,003.22 | 6,877.77 | 6,483.76 |
| 5 | 154,738.57 | 47,410.64 | 17,048.36 | 4,773.54 | 9,747.53 | 9,037.87 |
| 6 | 141,561.41 | 60,587.80 | 16,147.31 | 4,521.25 | 12,965.27 | 11,817.74 |
| 7 | 127,004.45 | 75,144.76 | 15,157.70 | 4,244.16 | 16,573.20 | 14,843.31 |
| 8 | 110,923.16 | 91,226.05 | 14,070.84 | 3,939.84 | 20,618.60 | 18,136.30 |
| 9 | 93,157.94 | 108,991.27 | 12,877.45 | 3,605.69 | 25,154.54 | 21,720.39 |
| 10 | 73,532.50 | 128,616.71 | 11,567.27 | 3,238.84 | 30,240.52 | 25,621.27 |
| 11 | 51,852.01 | 150,297.20 | 10,128.94 | 2,836.10 | 35,943.22 | 29,866.94 |
| 12 | 27,901.27 | 174,247.94 | 8,550.21 | 2,394.06 | 42,337.44 | 34,487.89 |
| 13 | 1,442.58 | 200,706.63 | 6,817.61 | 1,908.93 | 49,507.01 | 39,517.31 |
| 14 | 0.00 | 200,000.00 | 4,408.12 | 1,234.27 | 26,395.14 | 44,991.26 |
| 15 | 0.00 | 200,000.00 | 1,559.17 | 436.57 | 14.58 | 48,968.09 |

TABLE 6

| Year | Balance | Equity | Interest | Tax-Deduct | Loan | IRA |
|---|---|---|---|---|---|---|
| 1 | 218,178.67 | 6,821.33 | 22,192.99 | 6,214.04 | 0.00 | 0.00 |
| 2 | 210,643.05 | 16,774.81 | 21,706.79 | 6,077.90 | 2,290.09 | 2,228.47 |
| 3 | 199,647.30 | 27,770.56 | 20,942.23 | 5,863.82 | 4,857.89 | 4,653.92 |
| 4 | 187,500.15 | 39,917.71 | 20,102.18 | 5,628.61 | 7,737.04 | 7,293.75 |
| 5 | 174,081.04 | 53,336.82 | 19,179.35 | 5,370.22 | 10,965.32 | 10,166.93 |
| 6 | 159,256.77 | 68,161.09 | 18,165.65 | 5,086.38 | 14,585.06 | 13,294.07 |
| 7 | 142,880.22 | 84,537.64 | 17,052.28 | 4,774.64 | 18,643.71 | 16,697.62 |
| 8 | 124,788.82 | 102,629.04 | 15,829.60 | 4,432.29 | 23,194.53 | 20,402.02 |
| 9 | 104,803.01 | 122,614.85 | 14,487.01 | 4,056.36 | 28,297.17 | 24,433.85 |
| 10 | 82,724.43 | 144,693.43 | 13,012.99 | 3,643.64 | 34,018.56 | 28,822.04 |
| 11 | 58,333.94 | 169,083.92 | 11,394.85 | 3,190.56 | 40,433.72 | 33,598.12 |
| 12 | 31,389.44 | 196,028.42 | 9,618.74 | 2,693.25 | 47,626.78 | 38,796.37 |
| 13 | 1,623.49 | 225,794.37 | 7,669.51 | 2,147.46 | 55,692.06 | 44,454.10 |
| 14 | 0.00 | 225,000.00 | 4,958.87 | 1,388.48 | 29,692.01 | 50,611.93 |
| 15 | 0.00 | 225,000.00 | 1,753.75 | 491.05 | 13.58 | 55,085.57 |

TABLE 7

| Year | Balance | Equity | Interest | Tax-Deduct | Loan | IRA |
|---|---|---|---|---|---|---|
| 1 | 242,420.75 | 7,579.25 | 24,658.87 | 6,904.48 | 0.00 | 0.00 |
| 2 | 234,047.84 | 18,638.67 | 24,118.64 | 6,753.22 | 2,544.43 | 2,475.96 |
| 3 | 221,830.36 | 30,856.15 | 23,269.11 | 6,515.35 | 5,397.39 | 5,170.79 |
| 4 | 208,333.55 | 44,352.96 | 22,335.72 | 6,254.00 | 8,596.29 | 8,103.80 |
| 5 | 193,423.44 | 59,263.07 | 21,310.32 | 5,966.89 | 12,183.09 | 11,296.08 |
| 6 | 176,952.06 | 75,734.45 | 20,183.98 | 5,651.51 | 16,204.82 | 14,770.51 |
| 7 | 158,755.91 | 93,930.60 | 18,946.89 | 5,305.13 | 20,714.23 | 18,552.05 |
| 8 | 138,654.38 | 114,032.13 | 17,588.31 | 4,924.73 | 25,770.44 | 22,667.84 |
| 9 | 116,447.96 | 136,238.55 | 16,096.54 | 4,507.03 | 31,439.77 | 27,147.44 |
| 10 | 91,916.23 | 160,770.26 | 14,458.69 | 4,048.43 | 37,796.56 | 32,022.97 |

TABLE 7-continued

| Year | Balance | Equity | Interest | Tax-Deduct | Loan | IRA |
|---|---|---|---|---|---|---|
| 11 | 64,815.70 | 187,870.81 | 12,660.72 | 3,545.00 | 44,924.18 | 37,329.48 |
| 12 | 34,877.40 | 217,809.11 | 10,687.23 | 2,992.42 | 52,916.08 | 43,105.04 |
| 13 | 1,804.19 | 250,882.32 | 8,521.40 | 2,385.99 | 61,877.06 | 49,391.10 |
| 14 | 0.00 | 250,000.00 | 5,509.54 | 1,542.67 | 32,988.33 | 56,232.78 |
| 15 | 0.00 | 250,000.00 | 1,948.29 | 545.52 | 11.99 | 61,203.25 |

TABLE 8

| Yr/Mo | Interest | Principal | Balance | Equity | Loan | IRA |
|---|---|---|---|---|---|---|
| 1/1 | 833.33 | 241.28 | 99,758.72 | 241.28 | 0.00 | 0.00 |
| 1/2 | 831.32 | 243.29 | 99,515.43 | 484.57 | 0.00 | 0.00 |
| 1/3 | 829.30 | 245.31 | 99,270.12 | 729.88 | 0.00 | 0.00 |
| 1/4 | 827.25 | 247.36 | 99,022.76 | 977.24 | 0.00 | 0.00 |
| 1/5 | 825.19 | 249.42 | 98,773.34 | 1,226.66 | 0.00 | 0.00 |
| 1/6 | 823.11 | 251.50 | 98,521.84 | 1,478.16 | 0.00 | 0.00 |
| 1/7 | 821.02 | 253.59 | 98,268.25 | 1,731.75 | 0.00 | 0.00 |
| 1/8 | 818.90 | 255.71 | 98,012.54 | 1,987.46 | 0.00 | 0.00 |
| 1/9 | 816.77 | 257.84 | 97,754.70 | 2,245.30 | 0.00 | 0.00 |
| 1/10 | 814.62 | 259.99 | 97,494.71 | 2,505.29 | 0.00 | 0.00 |
| 1/11 | 812.46 | 262.15 | 97,232.56 | 2,767.44 | 0.00 | 0.00 |
| 1/12 | 810.27 | 264.34 | 96,968.22 | 3,031.78 | 0.00 | 0.00 |
| 2/1 | 808.07 | 1,341.15 | 96,701.68 | 4,372.93 | 915.00 | 915.00 |
| 2/2 | 805.85 | 268.76 | 96,432.92 | 4,641.69 | 923.77 | 921.48 |
| 2/3 | 803.61 | 271.00 | 96,161.92 | 4,912.69 | 932.62 | 928.01 |
| 2/4 | 801.35 | 273.26 | 95,888.66 | 5,185.95 | 941.56 | 934.58 |
| 2/5 | 799.07 | 275.54 | 95,613.12 | 5,461.49 | 950.58 | 941.20 |
| 2/6 | 796.78 | 277.83 | 95,335.29 | 5,739.32 | 959.69 | 947.87 |
| 2/7 | 794.46 | 280.15 | 95,055.14 | 6,019.47 | 968.89 | 954.58 |
| 2/8 | 792.13 | 282.48 | 94,772.66 | 6,301.95 | 978.18 | 961.34 |
| 2/9 | 789.77 | 284.84 | 94,487.82 | 6,586.79 | 987.55 | 968.15 |
| 2/10 | 787.40 | 287.21 | 94,200.61 | 6,874.00 | 997.01 | 975.01 |
| 2/11 | 785.01 | 289.60 | 93,911.01 | 7,163.60 | 1,006.56 | 981.92 |
| 2/12 | 782.59 | 292.02 | 93,618.99 | 7,455.62 | 1,016.21 | 988.88 |
| 3/1 | 771.20 | 1,378.02 | 92,240.97 | 8,833.64 | 1,940.95 | 1,910.88 |
| 3/2 | 768.67 | 305.94 | 91,935.03 | 9,139.58 | 1,959.55 | 1,924.42 |
| 3/3 | 766.13 | 308.48 | 91,626.55 | 9,448.06 | 1,978.33 | 1,938.05 |
| 3/4 | 763.55 | 311.06 | 91,315.49 | 9,759.12 | 1,997.29 | 1,951.78 |
| 3/5 | 760.96 | 313.65 | 91,001.84 | 10,072.77 | 2,016.43 | 1,965.61 |
| 3/6 | 758.35 | 316.26 | 90,685.58 | 10,389.03 | 2,035.75 | 1,979.53 |
| 3/7 | 755.71 | 318.90 | 90,366.68 | 10,707.93 | 2,055.26 | 1,993.55 |
| 3/8 | 753.06 | 321.55 | 90,045.13 | 11,029.48 | 2,074.96 | 2,007.67 |
| 3/9 | 750.38 | 324.23 | 89,720.90 | 11,353.71 | 2,094.85 | 2,021.89 |
| 3/10 | 747.67 | 326.94 | 89,393.96 | 11,680.65 | 2,114.93 | 2,036.21 |
| 3/11 | 744.95 | 329.66 | 89,064.30 | 12,010.31 | 2,135.20 | 2,050.63 |
| 3/12 | 742.20 | 332.41 | 88,731.89 | 12,342.72 | 2,155.66 | 2,065.16 |
| 4/1 | 730.48 | 1,418.74 | 87,313.15 | 13,761.46 | 3,091.32 | 2,994.79 |
| 4/2 | 727.61 | 347.00 | 86,966.15 | 14,108.46 | 3,120.95 | 3,016.00 |
| 4/3 | 724.72 | 349.89 | 86,616.26 | 14,458.35 | 3,150.86 | 3,037.36 |
| 4/4 | 721.80 | 352.81 | 86,263.45 | 14,811.16 | 3,181.06 | 3,058.87 |
| 4/5 | 718.86 | 355.75 | 85,907.70 | 15,166.91 | 3,211.55 | 3,080.54 |
| 4/6 | 715.90 | 358.71 | 85,548.99 | 15,525.62 | 3,242.33 | 3,102.36 |
| 4/7 | 712.91 | 361.70 | 85,187.29 | 15,887.32 | 3,273.40 | 3,124.34 |
| 4/8 | 709.89 | 364.72 | 84,822.57 | 16,252.04 | 3,304.77 | 3,146.47 |
| 4/9 | 706.85 | 367.76 | 84,454.81 | 16,619.80 | 3,336.44 | 3,168.76 |
| 4/10 | 703.79 | 370.82 | 84,083.99 | 16,990.62 | 3,368.41 | 3,191.21 |
| 4/11 | 700.70 | 373.91 | 83,710.08 | 17,364.53 | 3,400.69 | 3,213.81 |
| 4/12 | 697.58 | 377.03 | 83,333.05 | 17,741.56 | 3,433.28 | 3,236.57 |
| 5/1 | 685.49 | 1,463.73 | 81,869.32 | 19,205.29 | 4,381.18 | 4,174.50 |
| 5/2 | 682.24 | 392.37 | 81,476.95 | 19,597.66 | 4,423.17 | 4,204.07 |
| 5/3 | 678.97 | 395.64 | 81,081.31 | 19,993.30 | 4,465.56 | 4,233.85 |
| 5/4 | 675.68 | 398.93 | 80,682.38 | 20,392.23 | 4,508.35 | 4,263.84 |
| 5/5 | 672.35 | 402.26 | 80,280.12 | 20,794.49 | 4,551.56 | 4,294.04 |
| 5/6 | 669.00 | 405.61 | 79,874.51 | 21,200.10 | 4,595.18 | 4,324.46 |
| 5/7 | 665.62 | 408.99 | 79,465.52 | 21,609.09 | 4,639.22 | 4,355.09 |
| 5/8 | 662.21 | 412.40 | 79,053.12 | 22,021.49 | 4,683.68 | 4,385.94 |
| 5/9 | 658.78 | 415.83 | 78,637.29 | 22,437.32 | 4,728.57 | 4,417.01 |
| 5/10 | 655.31 | 419.30 | 78,217.99 | 22,856.62 | 4,773.89 | 4,448.30 |
| 5/11 | 651.82 | 422.79 | 77,795.20 | 23,279.41 | 4,819.64 | 4,479.81 |
| 5/12 | 648.29 | 426.32 | 77,368.88 | 23,705.73 | 4,865.83 | 4,511.54 |
| 6/1 | 635.79 | 1,513.43 | 75,855.45 | 25,219.16 | 5,827.46 | 5,458.50 |
| 6/2 | 632.13 | 442.48 | 75,412.97 | 25,661.64 | 5,883.31 | 5,497.16 |
| 6/3 | 628.44 | 446.17 | 74,966.80 | 26,107.81 | 5,939.69 | 5,536.10 |
| 6/4 | 624.72 | 449.89 | 74,516.91 | 26,557.70 | 5,996.61 | 5,575.31 |

TABLE 8-continued

| Yr/Mo | Interest | Principal | Balance | Equity | Loan | IRA |
|---|---|---|---|---|---|---|
| 6/5 | 620.97 | 453.64 | 74,063.27 | 27,011.34 | 6,054.08 | 5,614.80 |
| 6/6 | 617.19 | 457.42 | 73,605.85 | 27,468.76 | 6,112.10 | 5,654.57 |
| 6/7 | 613.38 | 461.23 | 73,144.62 | 27,929.99 | 6,170.67 | 5,694.62 |
| 6/8 | 609.54 | 465.07 | 72,679.55 | 28,395.06 | 6,229.81 | 5,734.96 |
| 6/9 | 605.66 | 468.95 | 72,210.60 | 28,864.01 | 6,289.51 | 5,775.58 |
| 6/10 | 601.75 | 472.86 | 71,737.74 | 29,336.87 | 6,349.78 | 5,816.49 |
| 6/11 | 597.81 | 476.80 | 71,260.94 | 29,813.67 | 6,410.63 | 5,857.69 |
| 6/12 | 593.84 | 480.77 | 70,780.17 | 30,294.44 | 6,472.07 | 5,899.18 |
| 7/1 | 580.88 | 1,568.34 | 69,211.83 | 31,862.78 | 7,449.09 | 6,855.97 |
| 7/2 | 576.77 | 497.84 | 68,713.99 | 32,360.62 | 7,520.48 | 6,904.53 |
| 7/3 | 572.62 | 501.99 | 68,212.00 | 32,862.61 | 7,592.55 | 6,953.44 |
| 7/4 | 568.43 | 506.18 | 67,705.82 | 33,368.79 | 7,665.31 | 7,002.69 |
| 7/5 | 564.22 | 510.39 | 67,195.43 | 33,879.18 | 7,738.77 | 7,052.29 |
| 7/6 | 559.96 | 514.65 | 66,680.78 | 34,393.83 | 7,812.93 | 7,102.24 |
| 7/7 | 555.67 | 518.94 | 66,161.84 | 34,912.77 | 7,887.80 | 7,152.55 |
| 7/8 | 551.35 | 523.26 | 65,638.58 | 35,436.03 | 7,963.39 | 7,203.21 |
| 7/9 | 546.99 | 527.62 | 65,110.96 | 35,963.65 | 8,039.71 | 7,254.23 |
| 7/10 | 542.59 | 532.02 | 64,578.94 | 36,495.67 | 8,116.76 | 7,305.61 |
| 7/11 | 538.16 | 536.45 | 64,042.49 | 37,032.12 | 8,194.55 | 7,357.36 |
| 7/12 | 533.69 | 540.92 | 63,501.57 | 37,573.04 | 8,273.08 | 7,409.47 |
| 8/1 | 520.22 | 1,629.00 | 61,872.57 | 39,202.04 | 9,267.36 | 8,376.95 |
| 8/2 | 515.60 | 559.01 | 61,313.56 | 39,761.05 | 9,356.17 | 8,436.29 |
| 8/3 | 510.95 | 563.66 | 60,749.90 | 40,324.71 | 9,445.83 | 8,496.05 |
| 8/4 | 506.25 | 568.36 | 60,181.54 | 40,893.07 | 9,536.35 | 8,556.23 |
| 8/5 | 501.51 | 573.10 | 59,608.44 | 41,466.17 | 9,627.74 | 8,616.84 |
| 8/6 | 496.74 | 577.87 | 59,030.57 | 42,044.04 | 9,720.01 | 8,677.88 |
| 8/7 | 491.92 | 582.69 | 58,447.88 | 42,626.73 | 9,813.16 | 8,739.35 |
| 8/8 | 487.07 | 587.54 | 57,860.34 | 43,214.27 | 9,907.20 | 8,801.25 |
| 8/9 | 482.17 | 592.44 | 57,267.90 | 43,806.71 | 10,002.14 | 8,863.59 |
| 8/10 | 477.23 | 597.38 | 56,670.52 | 44,404.09 | 10,097.99 | 8,926.37 |
| 8/11 | 472.25 | 602.36 | 56,068.16 | 45,006.45 | 10,194.76 | 8,989.60 |
| 8/12 | 467.23 | 607.38 | 55,460.78 | 45,613.83 | 10,292.46 | 9,053.28 |
| 9/1 | 453.22 | 1,696.00 | 53,764.78 | 47,309.83 | 11,306.10 | 10,032.41 |
| 9/2 | 448.04 | 626.57 | 53,138.21 | 47,936.40 | 11,414.45 | 10,103.47 |
| 9/3 | 442.82 | 631.79 | 52,506.42 | 48,568.19 | 11,523.84 | 10,175.04 |
| 9/4 | 437.55 | 637.06 | 51,869.36 | 49,205.25 | 11,634.28 | 10,247.11 |
| 9/5 | 432.24 | 642.37 | 51,226.99 | 49,847.62 | 11,745.78 | 10,319.69 |
| 9/6 | 426.89 | 647.72 | 50,579.27 | 50,495.34 | 11,858.34 | 10,392.79 |
| 9/7 | 421.49 | 653.12 | 49,926.15 | 51,148.46 | 11,971.98 | 10,466.41 |
| 9/8 | 416.05 | 658.56 | 49,267.59 | 51,807.02 | 12,086.71 | 10,540.55 |
| 9/9 | 410.56 | 664.05 | 48,603.54 | 52,471.07 | 12,202.54 | 10,615.21 |
| 9/10 | 405.03 | 669.58 | 47,933.96 | 53,140.65 | 12,319.48 | 10,690.40 |
| 9/11 | 399.45 | 675.16 | 47,258.80 | 53,815.81 | 12,437.54 | 10,766.12 |
| 9/12 | 393.82 | 680.79 | 46,578.01 | 54,496.60 | 12,556.73 | 10,842.38 |
| 10/1 | 379.19 | 1,770.03 | 44,807.98 | 56,266.63 | 13,592.07 | 11,834.18 |
| 10/2 | 373.40 | 701.21 | 44,106.77 | 56,967.84 | 13,722.33 | 11,918.01 |
| 10/3 | 367.56 | 707.05 | 43,399.72 | 57,674.89 | 13,853.84 | 12,002.43 |
| 10/4 | 361.66 | 712.95 | 42,686.77 | 58,387.84 | 13,986.61 | 12,087.05 |
| 10/5 | 355.72 | 718.89 | 41,967.88 | 59,106.73 | 14,120.65 | 12,173.07 |
| 10/6 | 349.73 | 724.88 | 41,243.00 | 59,831.61 | 14,255.97 | 12,259.30 |
| 10/7 | 343.69 | 730.92 | 40,512.08 | 60,562.53 | 14,392.59 | 12,346.14 |
| 10/8 | 337.60 | 737.01 | 39,775.07 | 61,299.54 | 14,530.52 | 12,433.59 |
| 10/9 | 331.46 | 743.15 | 39,031.92 | 62,042.69 | 14,669.77 | 12,521.66 |
| 10/10 | 325.27 | 749.34 | 38,282.58 | 62,792.03 | 14,810.36 | 12,610.36 |
| 10/11 | 319.02 | 755.59 | 37,526.99 | 63,547.62 | 14,952.29 | 12,699.68 |
| 10/12 | 312.72 | 761.89 | 36,765.10 | 64,309.51 | 15,095.58 | 12,789.64 |
| 11/1 | 297.42 | 1,851.80 | 34,913.30 | 66,161.31 | 16,155.25 | 13,795.23 |
| 11/2 | 290.94 | 783.67 | 34,129.63 | 66,944.98 | 16,310.07 | 13,892.95 |
| 11/3 | 284.41 | 790.20 | 33,339.43 | 67,735.18 | 16,466.37 | 13,991.36 |
| 11/4 | 277.83 | 796.78 | 32,542.65 | 68,531.96 | 16,624.17 | 14,090.47 |
| 11/5 | 271.19 | 803.42 | 31,739.23 | 69,335.38 | 16,783.48 | 14,190.28 |
| 11/6 | 264.49 | 810.12 | 30,929.11 | 70,145.50 | 16,944.32 | 14,290.79 |
| 11/7 | 257.74 | 816.87 | 30,112.24 | 70,962.37 | 17,106.70 | 14,392.02 |
| 11/8 | 250.94 | 823.67 | 29,288.57 | 71,786.04 | 17,270.64 | 14,493.96 |
| 11/9 | 244.07 | 830.54 | 28,458.03 | 72,616.58 | 17,436.15 | 14,596.63 |
| 11/10 | 237.15 | 837.46 | 27,620.57 | 73,454.04 | 17,603.25 | 14,700.02 |
| 11/11 | 230.17 | 844.44 | 26,776.13 | 74,298.48 | 17,771.95 | 14,804.15 |
| 11/12 | 223.13 | 851.48 | 25,924.65 | 75,149.96 | 17,942.26 | 14,909.01 |
| 12/1 | 207.08 | 1,942.14 | 23,982.51 | 77,092.10 | 19,029.21 | 15,929.62 |
| 12/2 | 199.85 | 874.76 | 23,107.75 | 77,966.86 | 19,211.57 | 16,042.45 |
| 12/3 | 192.56 | 882.05 | 22,225.70 | 78,848.91 | 19,395.68 | 16,156.08 |
| 12/3 | 185.21 | 889.40 | 21,336.30 | 79,738.31 | 19,581.56 | 16,270.52 |
| 12/5 | 177.80 | 896.81 | 20,439.49 | 80,635.12 | 19,769.22 | 16,385.77 |
| 12/6 | 170.33 | 904.28 | 19,535.21 | 81,539.40 | 19,958.68 | 16,501.84 |
| 12/7 | 162.79 | 911.82 | 18,623.39 | 82,451.22 | 20,149.95 | 16,618.73 |
| 12/8 | 155.19 | 919.42 | 17,703.97 | 83,370.64 | 20,34 .05 | 16,736.45 |
| 12/9 | 147.53 | 927.08 | 16,776.89 | 84,297.72 | 20,538.00 | 16,855.00 |

TABLE 8-continued

| Yr/Mo | Interest | Principal | Balance | Equity | Loan | IRA |
|---|---|---|---|---|---|---|
| 12/10 | 139.81 | 934.80 | 15,842.09 | 85,232.52 | 20,734.82 | 16,974.39 |
| 12/11 | 132.02 | 942.59 | 14,899.50 | 86,175.11 | 20,933.53 | 17,094.63 |
| 12/12 | 124.16 | 950.45 | 13,949.05 | 87,125.56 | 21,134.14 | 17,215.72 |
| 13/1 | 107.29 | 2,041.93 | 11,907.12 | 89,167.49 | 22,251.68 | 18,252.66 |
| 13/2 | 99.23 | 975.38 | 10,931.74 | 90,142.87 | 22,464.93 | 18,381.95 |
| 13/3 | 91.10 | 983.51 | 9,948.23 | 91,126.38 | 22,680.22 | 18,512.16 |
| 13/4 | 82.90 | 991.71 | 8,956.52 | 92,118.09 | 22,897.57 | 18,643.29 |
| 13/5 | 74.64 | 999.97 | 7,956.55 | 93,118.06 | 23,117.01 | 18,775.35 |
| 13/6 | 66.30 | 1,008.31 | 6,948.24 | 94,126.37 | 23,338.55 | 18,908.34 |
| 13/7 | 57.90 | 1,016.71 | 5,931.53 | 95,143.08 | 23,562.21 | 19,042.27 |
| 13/8 | 49.43 | 1,025.18 | 4,906.35 | 96,168.26 | 23,788.01 | 19,177.15 |
| 13/9 | 40.89 | 1,033.72 | 3,872.63 | 97,201.98 | 24,015.98 | 19,312.99 |
| 13/10 | 32.27 | 1,042.34 | 2,830.29 | 98,244.32 | 24,246.13 | 19,449.79 |
| 13/11 | 23.59 | 1,051.02 | 1,779.27 | 99,295.34 | 24,478.49 | 19,587.56 |
| 13/12 | 14.83 | 1,059.78 | 719.49 | 100,355.12 | 24,713.08 | 19,726.31 |
| 14/1 | 0.00 | 0.00 | 0.00 | 100,000.00 | 23,005.45 | 20,781.04 |
| 14/2 | 0.00 | 0.00 | 0.00 | 100,000.00 | 22,151.31 | 20,928.24 |
| 14/3 | 0.00 | 0.00 | 0.00 | 100,000.00 | 22,151.31 | 20,928.24 |
| 14/4 | 0.00 | 0.00 | 0.00 | 100,000.00 | 21,288.98 | 21,076.48 |
| 14/5 | 0.00 | 0.00 | 0.00 | 100,000.00 | 20,418.39 | 21,225.77 |
| 14/6 | 0.00 | 0.00 | 0.00 | 100,000.00 | 19,539.46 | 21,376.12 |
| 14/7 | 0.00 | 0.00 | 0.00 | 100,000.00 | 18,652.10 | 21,527.53 |
| 14/8 | 0.00 | 0.00 | 0.00 | 100,000.00 | 17,756.24 | 21,680.02 |
| 14/9 | 0.00 | 0.00 | 0.00 | 100,000.00 | 16,851.79 | 21,833.59 |
| 14/10 | 0.00 | 0.00 | 0.00 | 100,000.00 | 15,938.68 | 21,988.24 |
| 14/11 | 0.00 | 0.00 | 0.00 | 100,000.00 | 15,016.82 | 22,143.99 |
| 14/12 | 0.00 | 0.00 | 0.00 | 100,000.00 | 14,086.12 | 22,300.84 |
| 15/1 | 0.00 | 0.00 | 0.00 | 100,000.00 | 13,146.50 | 22,458.80 |
| 15/2 | 0.00 | 0.00 | 0.00 | 100,000.00 | 10,155.26 | 22,778.09 |
| 15/3 | 0.00 | 0.00 | 0.00 | 100,000.00 | 9,177.97 | 22,939.43 |
| 15/4 | 0.00 | 0.00 | 0.00 | 100,000.00 | 8,191.32 | 23,101.92 |
| 15/5 | 0.00 | 0.00 | 0.00 | 100,000.00 | 7,195.21 | 23,265.56 |
| 15/6 | 0.00 | 0.00 | 0.00 | 100,000.00 | 5,174.26 | 23,596.33 |
| 15/7 | 0.00 | 0.00 | 0.00 | 100,000.00 | 5,174.26 | 23,596.33 |
| 15/8 | 0.00 | 0.00 | 0.00 | 100,000.00 | 4,149.24 | 23,763.47 |
| 15/9 | 0.00 | 0.00 | 0.00 | 100,000.00 | 3,114.39 | 23,931.79 |
| 15/10 | 0.00 | 0.00 | 0.00 | 100,000.00 | 2,069.63 | 24,101.31 |
| 15/11 | 0.00 | 0.00 | 0.00 | 100,000.00 | 1,014.85 | 24,272.03 |
| 15/12 | 0.00 | 0.00 | 0.00 | 100,000.00 | −50.03 | 24,443.96 |

What is claimed is:

1. A method, implemented on a computer for implementing a nest egg mortgage plan which comprises: determining an amount of mortgage for which an applicant would qualify and a predetermined term of repayment of principal therefor based on conventional lending practices; creating an accelerated payment schedule for such mortgage so that the principal is repaid within a shorter time than the predetermined term of the mortgage; applying the difference between the accelerated payments and nonaccelerated payments as a source of equity; providing an equity loan against the source of equity; applying the loan to generate an investment vehicle; and automatically computing the amounts for each of the previously recited steps using a computer, whereby amounts placed in the investment vehicle increase over the term of the mortgage while the equity loan and mortgage principal are repaid to by the end of the term of the mortgage, and wherein said applying step further comprises automatically creating an investment vehicle and automatically transferring amounts borrowed from said loan into said investment vehicle.

2. The method of claim 1 wherein the accelerated payment schedule is created by providing a bi-weekly mortgage payment plan.

3. The method of claim 1 wherein the equity loan is provided as a home equity loan.

4. The method of claim 1 which further comprises selecting the investment vehicle to be an individual retirement account, a savings account, a securities investment account, an insurance policy, an annuity, or combinations thereof.

5. The method of claim 1 which further comprises generating all paperwork in connection with the mortgage plan before the mortgage is implemented.

6. The method of claim 1 which further comprises utilizing a computer means to operate and implement the mortgage plan.

7. The method of claim 1 which further comprises providing the source of equity by applying the differences between the accelerated payments and non-accelerated payments in the first few years of the loan; and repaying the equity loan with the difference between the accelerated payments and the non-accelerated payments in the last few years of the loan.

8. A computer-based system for operating and implementing a nest egg mortgage plan comprising: means for determining an amount of mortgage for which an applicant would qualify and a term of repayment of principal therefor based on conventional lending practices; means for creating an accelerated payment schedule for such mortgage so that the principal is repaid within a shorter time than the term of the mortgage; means for applying the difference between the accelerated payments and non-accelerated payments as a source of equity; means for providing an equity loan against said source of equity; means for applying said loan to generate an investment vehicle whereby amounts placed in said investment vehicle increase over the term of the mortgage while the equity loan and mortgage principal are repaid by the end of the term of the mortgage and a computer operatively associated with each of said previously recited means for automatically determining amounts for operating and implementing the nest egg mortgage plan, and wherein said means for applying further comprises means for automatically creating an investment vehicle and means for automatically transferring amounts borrowed from said loan into said investment vehicle.

9. The system of claim 8 wherein the means for creating an accelerated payment schedule is a bi-weekly mortgage payment plan.

10. The system of claim 8 wherein the equity loan is a home equity loan.

11. The system of claim 8 wherein the investment vehicle is an individual retirement account, a savings account, a securities investment account, an insurance policy, an annuity, or combinations thereof.

12. The system of claim 8 further comprising computer means for operating and implementing said system.

13. The system of claim 11 wherein the computer means automatically provides the equity loan by applying the differences between the accelerated payments and non-accelerated payments in the first few years of the loan, and automatically repays the equity loan with the difference between the accelerated payments and the non-accelerated payments in the last few years of the loan.

* * * * *